United States Patent
Natali et al.

(10) Patent No.: US 7,412,018 B1
(45) Date of Patent: Aug. 12, 2008

(54) RAPID ACQUISITION SYNCHRONIZATION SEQUENCES FOR DIRECT SEQUENCE SPREAD SPECTRUM SYSTEMS USING CODE TIME OFFSETS

(75) Inventors: Francis D. Natali, Pt Townsend, WA (US); John E. Ohlson, Mountain View, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/573,218

(22) Filed: May 19, 2000

Related U.S. Application Data

(60) Provisional application No. 60/136,207, filed on May 26, 1999.

(51) Int. Cl.
*H04L 7/00* (2006.01)

(52) U.S. Cl. ....................... 375/367; 375/143
(58) Field of Classification Search ................. 375/354, 375/367, 343, 140, 143, 147, 152; 370/503
See application file for complete search history.

(56) References Cited

U.S. PATENT DOCUMENTS

| | | | | |
|---|---|---|---|---|
| 3,651,263 A * | 3/1972 | Lindback et al. | ............ | 375/365 |
| 4,011,406 A * | 3/1977 | Pospischil | ................. | 178/70 R |
| 4,027,261 A * | 5/1977 | Laurent et al. | ................ | 327/98 |
| 4,673,871 A * | 6/1987 | Brown et al. | ............. | 324/76.11 |
| 5,260,967 A | 11/1993 | Schilling | ....................... | 375/1 |
| 5,349,611 A * | 9/1994 | Varian | ........................ | 375/367 |
| 5,812,090 A * | 9/1998 | Chevalier et al. | ........... | 342/378 |
| 5,862,172 A * | 1/1999 | Sugita et al. | ................ | 375/142 |
| 5,870,426 A * | 2/1999 | Yokev et al. | ................ | 375/133 |
| 6,049,576 A | 4/2000 | Magill | ........................ | 375/365 |
| 6,292,106 B1 * | 9/2001 | Solinsky et al. | ........ | 340/825.49 |
| 6,411,610 B1 * | 6/2002 | Li et al. | ..................... | 370/335 |
| 6,512,785 B1 * | 1/2003 | Zhou et al. | .................. | 375/143 |
| 6,512,787 B1 * | 1/2003 | Tung et al. | .................. | 375/222 |
| 6,564,037 B1 * | 5/2003 | Sweatman et al. | ......... | 455/63.1 |
| 6,601,078 B1 * | 7/2003 | Bondarowicz et al. | ...... | 708/422 |
| 6,714,158 B1 * | 3/2004 | Underbrink et al. | .... | 342/357.12 |

* cited by examiner

*Primary Examiner*—Temesghen Ghebretinsae
(74) *Attorney, Agent, or Firm*—Bacon & Thomas, PLLC

(57) ABSTRACT

In a wireless communication system which includes a synchronization signal generator which generates a synchronization sequence, an RF transmitter which transmits the synchronization signal, and one or more receiver that receives the signal, where the synchronization sequence employs M PN codes of the same length that are repeated in a pseudo-random fashion for N code periods. Each receiver incorporates M filters matched to the M PN codes whose outputs are post detection combined in a manner consistent with the pseudo-random code transmission sequence to provide signal detection and synchronization. In another aspect, the synchronization sequence employs M time-shifted versions of a PN code that are repeated in a pseudo-random fashion for N code periods and each receiver incorporates a filter matched to the unshifted PN code and whose output samples are post detection combined in a manner consistent with the pseudo-random code transmission sequence to provide signal detection and synchronization.

1 Claim, 7 Drawing Sheets

Matched filter with post detection combining.

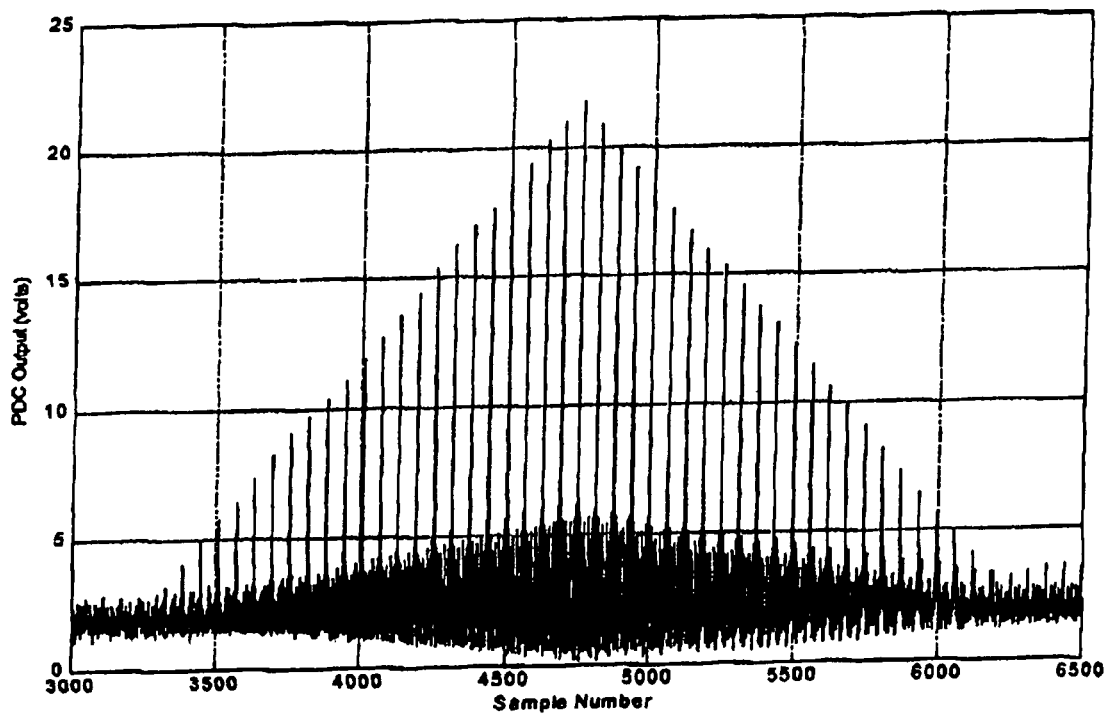
Figure 1. PDC output for Gold Code 1 (no noise) repeated 24 times and each code period multiplied by one bit of a 24 bit Neuman-Hofman code. Note that the correlation peaks are close in amplitude making it difficult to select the desired peak in a noisy environment.

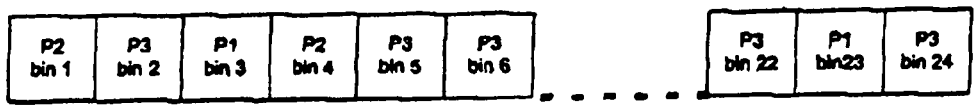
Figure 2. Three length 31 Gold Codes repeated in a psuedo-random sequence to form the sync burst.
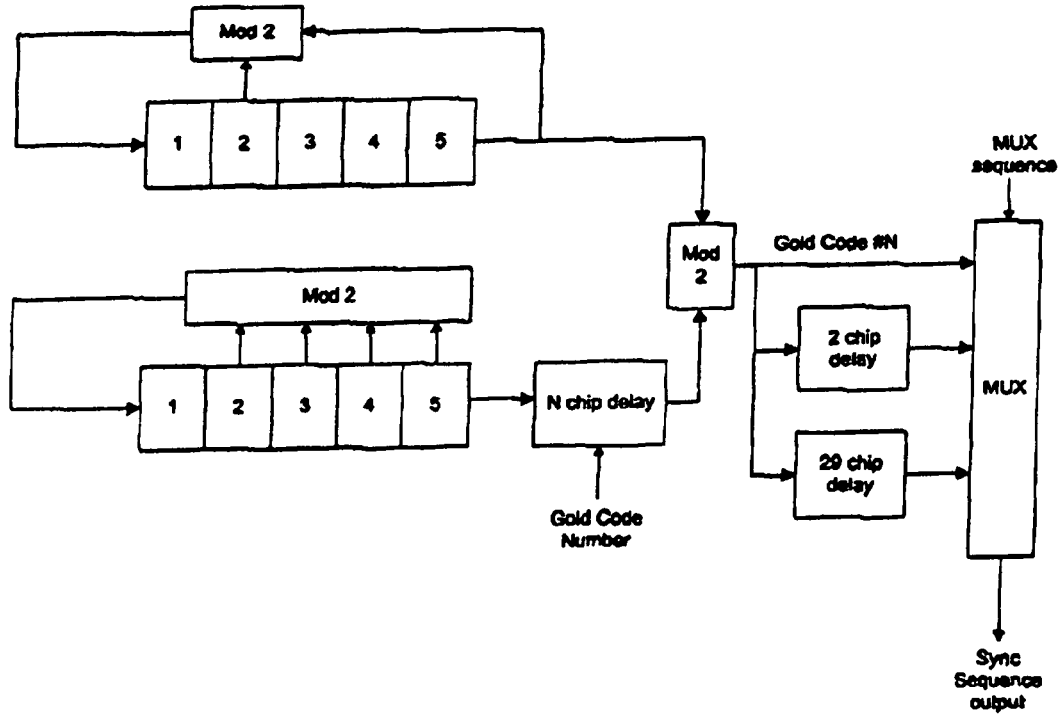
Figure 3. Sync Burst generator.

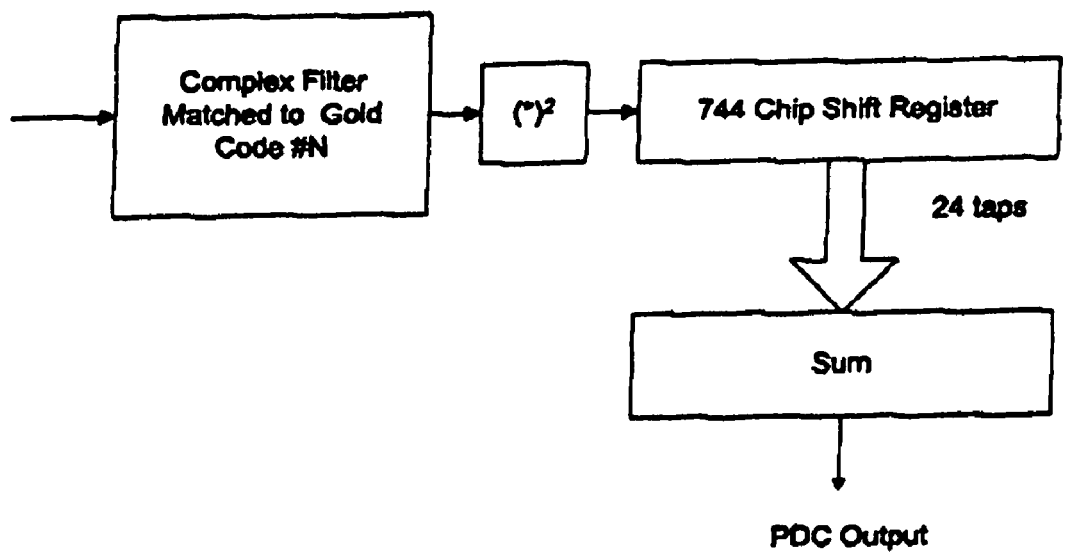
Figure 4. Matched filter with post detection combining.

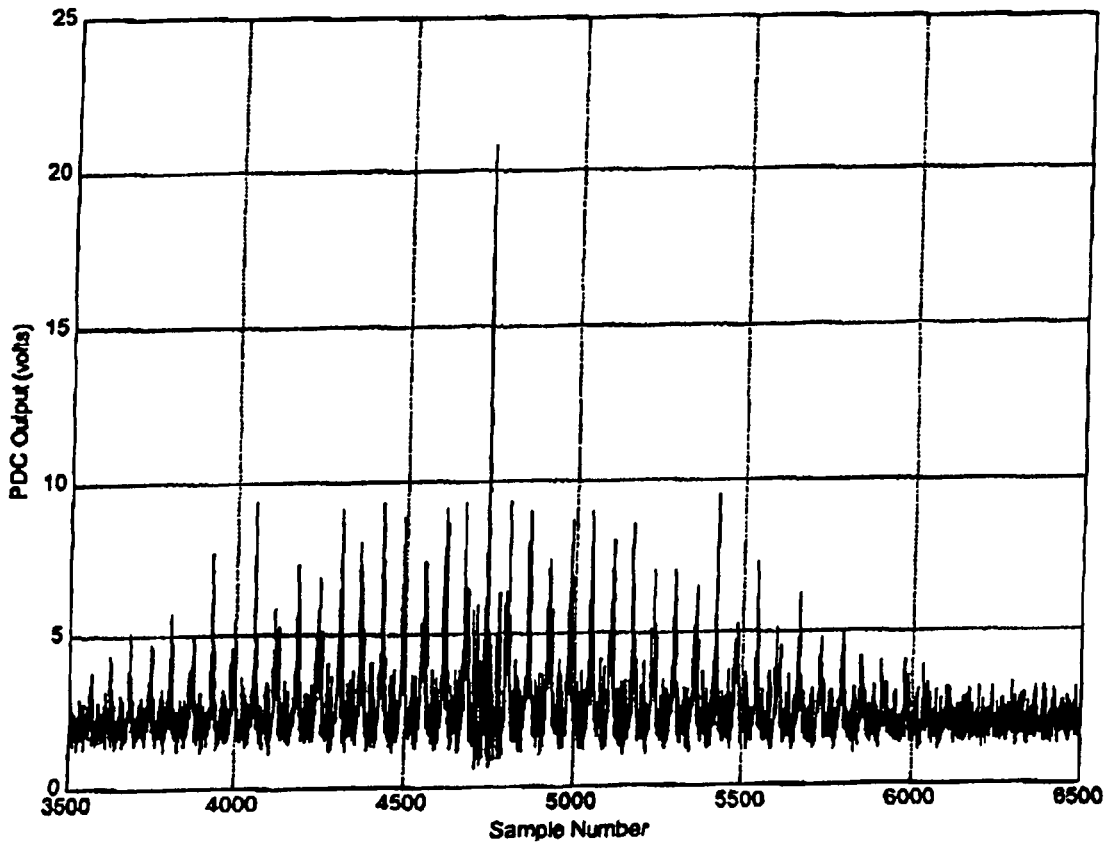
Figure 5. PDC output for Code 1 (no noise) with three offsets (0, 2 and -2 chips). Balanced sync code, i.e. all codes appear 8 times. Exhibits maximum sidelobe level of about −7.4 dB and a correlation loss of −1.2 dB (about 0.8 dB of loss is due to null-to-null filtering).

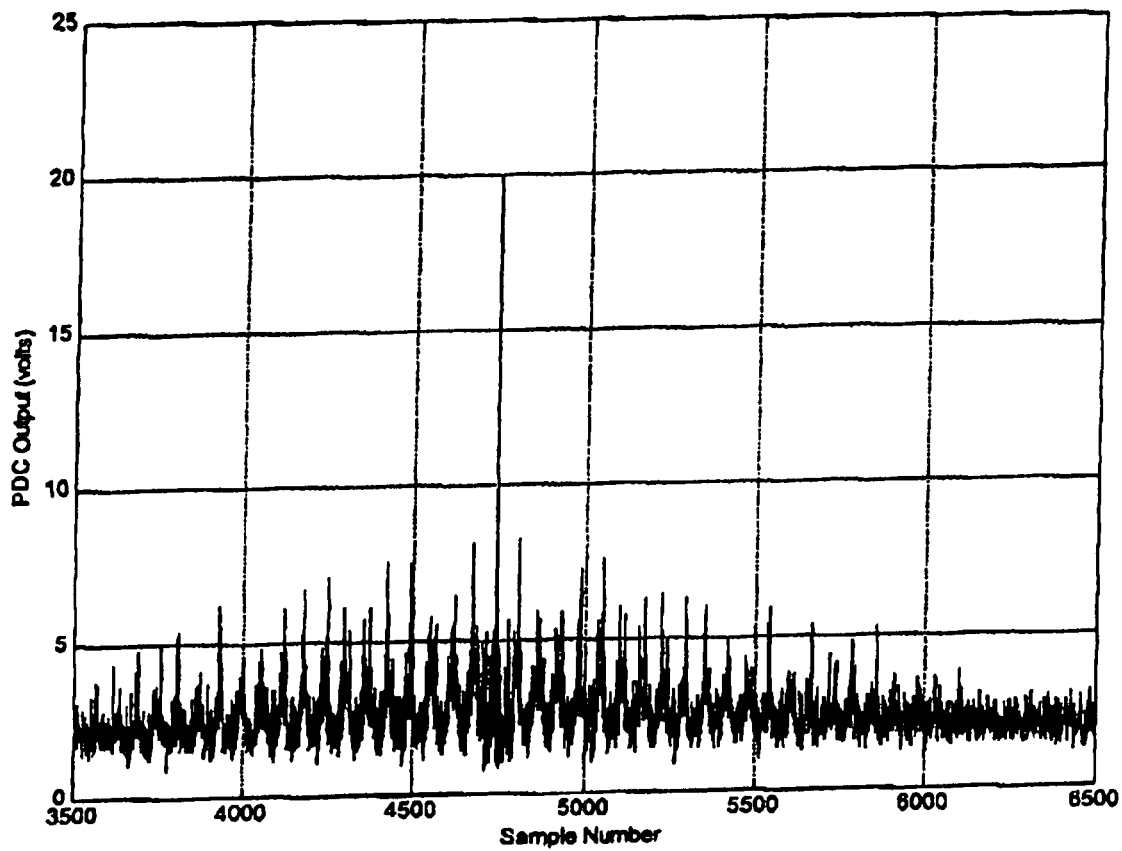
Figure 6. PDC output for Code 1 (no noise) with 5 time offsets at 0, 2, -2, 4, and -4 chips. Exhibits maximum sidelobe level of about −8 dB and a correlation loss of −1.6 dB.

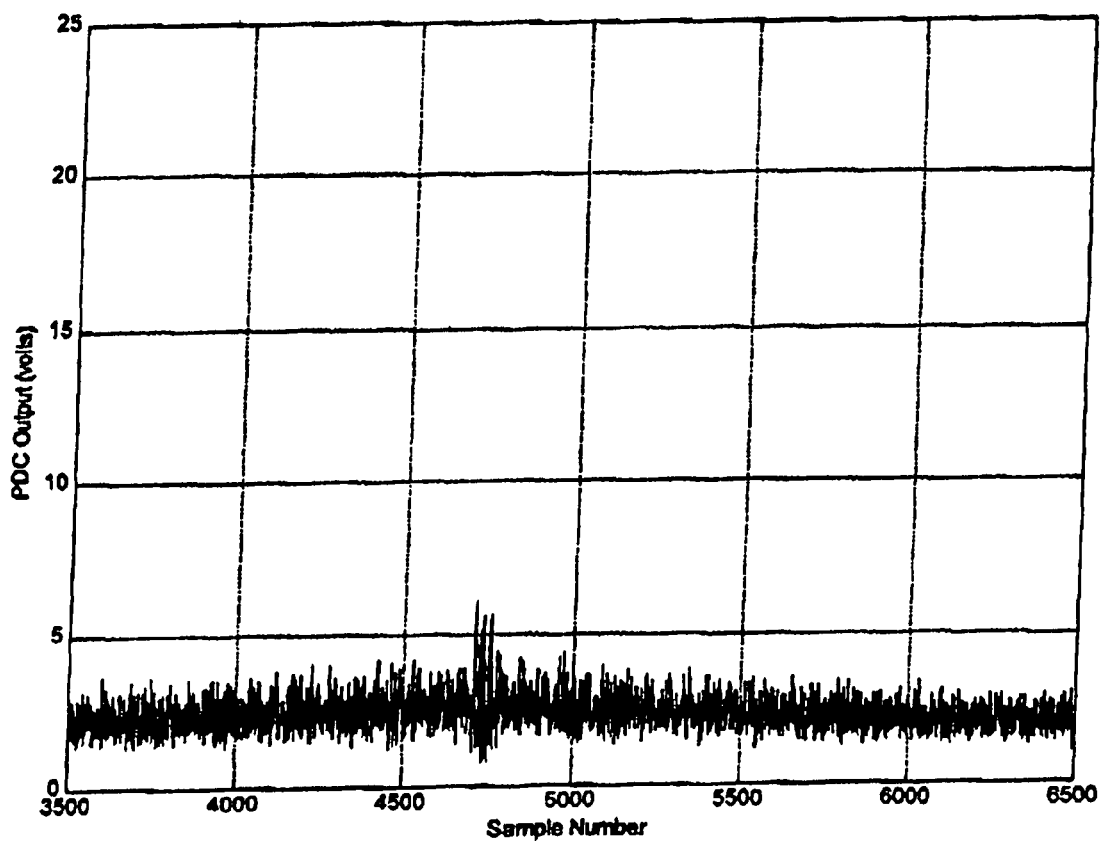
Figure 7. PDC output showing access noise when a sync burst generated from Gold Code #4 is input to a five offset system designed for Gold Code #1 (see the results of Figure 5).

RAPID ACQUISITION SYNCHRONIZATION SEQUENCES FOR DIRECT SEQUENCE SPREAD SPECTRUM SYSTEMS USING CODE TIME OFFSETS

REFERENCE TO RELATED APPLICATION

The present application is based on provisional Application No. 60/136,207 filed May 26, 1999 entitled RAPID ACQUISITION SYNCHRONIZATION SEQUENCES FOR DIRECT SEQUENCE SPREAD SPECTRUM SYSTEMS USING CODE TIME OFFSETS.

BACKGROUND AND BRIEF DESCRIPTION OF PRIOR ART

1. Golomb, S. W. et al, *Digital Communications With Space Applications*, Prentice Hall, Englewood Cliffs, N.J., 1964.
2. Titsworth, R. C., "Optimal Ranging Codes," IEEE TRANS. SPACE ELEC. TELM., March 1963.
3. Dixon, R. C., *Spread Spectrum Systems*, John Wiley and Sons, Inc., New York, N.Y.
4. Harris, R. L. editor, *Introduction to Spread Spectrum Techniques*, Ministry of Defense, Christchurch, Hampshire, UK
5. Schilling, D. L., U.S. Pat. No. 5,260,967, Nov. 9, 1993
6. Magill, D. T., U.S. Pat. No. 6,049,576, Apr. 11, 2000.

Spread spectrum (SS) communications is presently being used for a number of commercial applications and is expected to proliferate as the demand for untethered communications increases.

The SS User Terminals (UT) must achieve time and frequency synchronization with the received signal in order to despread and demodulate the signal data. This generally involves a two-dimensional search in time and frequency. Typically in a direct sequence system, a "sliding correlator" dwells at a selected frequency until the time uncertainty has been fully searched and is then stepped to another frequency if the signal was not found.

Considerable work has been done to formulate "acquirable" codes with characteristics that minimize the time required for the search process. The JPL component codes (1,2) are a well known example.

Dixon (3) discusses using a special code sequence at the beginning of a transmission as a "synchronization preamble." This is typically a short sequence that is repeated multiple times.

The Outbound (OB) link in a star configured network such as a cellular or satellite mobile telephone network is transmitted continuously and must be readily acquired by UT's at any time. In this case, it makes sense to introduce a synchronization sequence that is repeated periodically as part of a data framing structure.

The length of the sync sequence is generally determined by the amount of signal energy required for reliable signal detection and synchronization at a reasonable power level (the available signal energy is proportional to sync sequence length). However, if the sync sequence is constructed as a PN sequence, acquisition time generally increases with burst length. If matched filter detection is used, the filter bandwidth decreases with burst length, and more frequency bins must be searched.

One way to meet the sync energy requirement without using a code of excessive length is to form the required length sequence by repeating a short sequence several times. Davies (4) comments that once the short code is acquired, the time uncertainty is equal to the period of the code. The code itself may then be modulated with a pattern, each bit having the duration of the code, whose detection at the demodulator is the signal to make a transition to a different, longer, PN code. Thus, we have a synchronization sequence composed of a short, high rate code modulated by a low rate sequence. Schilling (5) suggests a sync code generator running at the data clock rate Mod(2) added to a sync chip code at the chipping rate. Magill (6) suggests a construction which employs Neuman-Hofman (N-H) codes for the high and low rate sequences to give desirable correlation properties.

A matched filter may be employed to detect the short high rate code. In this case, a correlation peak occurs every code period. Noncoherent post detection combining (PDC) can be used to enhance the output SNR over the length of the sync sequence. In this scheme, the desired correlation peak at the PDC output is only slightly larger than the adjacent peaks that are offset by a multiple of the code period as shown in FIG. 1. For example, if the sync code consists of 24 repetitions of a short code, the maximum correlation peak, which occurs when the sync burst is property aligned with the PDC time window, is less than 0.4 dB above the adjacent peaks. Thus, it is difficult to select the desired peak even at good signal to noise ratios. In this case, an ambiguity of an integer number of code periods exists. At this point, a coarse track operation could be implemented (on the detected correlation peak), to refine the frequency estimate. A coherent matched filter for the low rate code could then be enabled to resolve the code period ambiguity.

Note that the bandwidth of the coherent matched filtering required for ambiguity resolution in this scheme is very narrow (24 times narrower than the short code matched filter). This requires that a very accurate frequency estimate be made before the sync burst can be fully acquired, and multiple frequency bins may have to be examined.

OBJECTS OF THE INVENTION

The object of this invention is to provide a synchronization sequence construction that enables rapid, frequency robust, and power efficient acquisition of signal timing. A further object of this invention is to reduce undesired correlation peaks after post detection combining in order to allow single step (no coherent filter required) signal detection and time synchronization. Another object of this invention is to decrease acquisition time, and simplify hardware.

DESCRIPTION OF THE DRAWINGS

The above and other objects, advantages and features of the invention will become more apparent and clear when considered with the following specification and accompanying drawings, wherein:

FIG. 1 illustrates the PDC output for Gold Code 1 (no noise) repeated 24 times and each code period multiplied by one bit of a 24-bit Neuman-Hofman code; note that the correlation peaks are close in amplitude, making it difficult to select the desired peak in a noise environment;

FIG. 2 illustrates three-length 31 Gold Codes repeated in a pseudo-random sequence to form the sync burst;

FIG. 3 is a block diagram of a Sync Burst generator incorporated in the invention;

FIG. 4 is a block diagram of the matched filter with post detection combining as incorporated in the invention;

FIG. 5 illustrates the PDC output for Code 1 (no noise) with three offsets (0, 2 and −2 chips); balanced sync code, i.e. all codes appear eight times; note that it exhibits maximum sidelobe level of about −7.4 dB and a correlation loss of −1.2 dB (about 0.8 dB of loss is due to null-to-null filtering);

FIG. 6 illustrates the PDC output for Code 1 (no noise) with five time offsets at 0, 2, −2, 4, −4 chips; note that it exhibits maximum sidelobe level of about −8 dB and a correlation loss of −1.6 db;

FIG. 7 illustrates the PDC output showing access noise when a sync burst generated from Gold Code #4 is input to a five offset system designed for Gold Code #1 (see the results of FIG. 5)

DETAILED DESCRIPTION OF THE INVENTION

Figure 8:
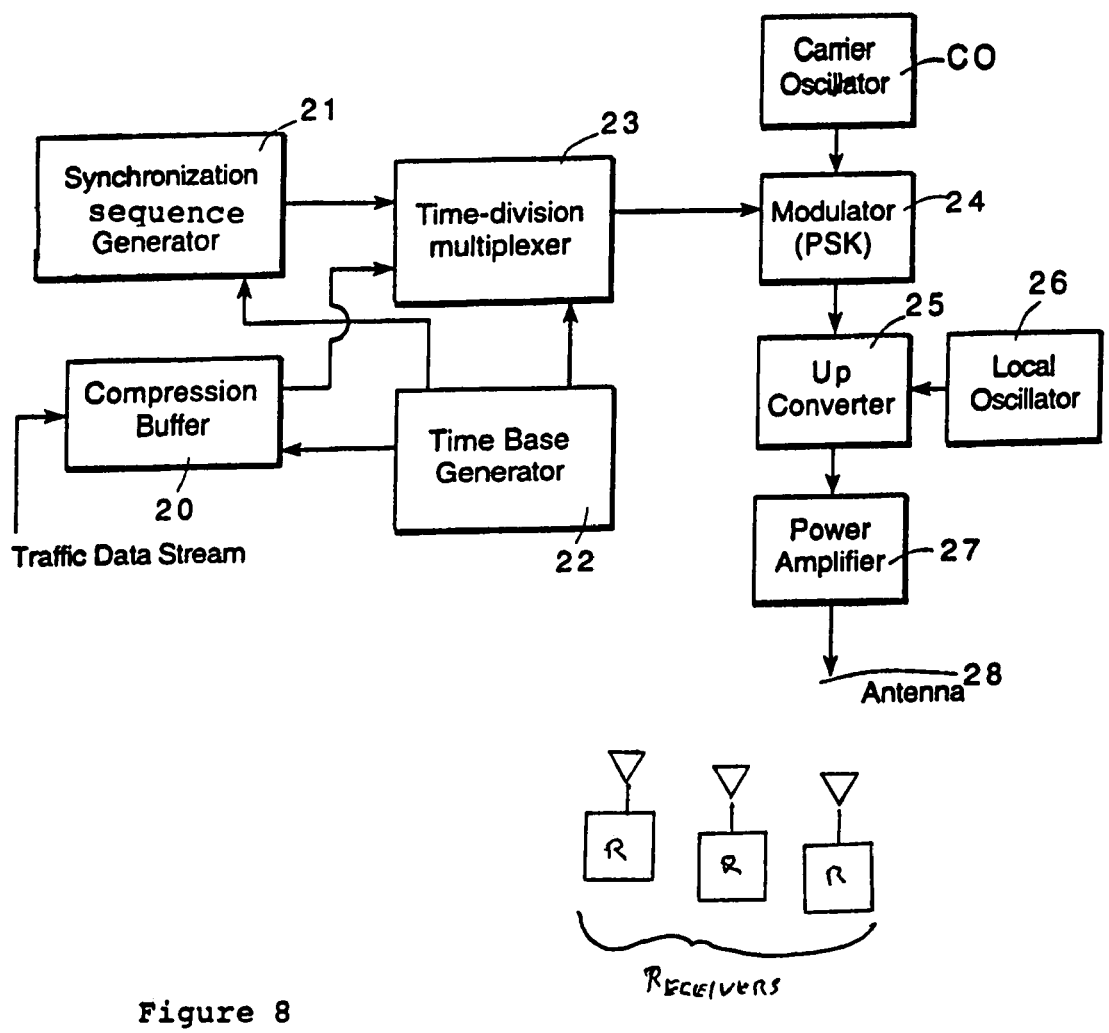
FIG. 8 is a block diagram of a representational transmitter illustrating time division multiplexing (TDM) of the synchronization (sync) word signal.

Consider a sync burst that is constructed using multiple short codes. For example, let us assume that we select three codes from the set of gold codes of length 31. Let these codes be repeated in a pseudo-random pattern such as shown in FIG. 2. Now suppose we input the received signal to three matched filters running in parallel. The outputs of the MF's are noncoherently detected and input to three parallel shift registers with length equal to 1 code periods. Shift register (SR) taps are provided at stages that are multiples of 31. PDC is performed by weighting the SR taps according to the known sequence of codes. When the sync sequence fully occupies the SR's, a correlation peak of L units will be observed. However, when the sequence is offset by one code period (31 chips), the observed peak will be considerably reduced. For example, if the code ordering was truly random, and the sequence was long, the offset correlation peak would be down by a factor equal to the number of codes employed. This corresponds to a minimum 9.5 dB reduction in the offset correlation peaks for a 3-code system. This reduction in the level of the spurious correlation peaks relative to the desired PDC peak is exactly what is needed to allow signal acquisition and synchronization in one step, without recourse to a coherent matched filter. Unfortunately, this advantage is gained at the cost of increased hardware complexity.

Now consider replacing the different codes in the above scheme with cyclic shifts of the same code. For example, instead of three different codes, use one code (P1) along with its cyclic shifts of two chips ahead (P2 and back P3). Assume these codes are sent in a sequence as in FIG. 2 where L=24. The sync sequence may be generated as shown in FIG. 3.

Once again, the receiver could incorporate three matched filters, matched to the proper cyclic shifts. However, a single filter matched to code P1 will respond to the cyclic shifts P2 and P3 with only a slight loss in correlation. The correlation peaks will occur with chip offsets corresponding to the code offsets. The MF output can be noncoherently detected and input to a PDC consisting of a 1488 stage SR (two samples per chip×31 chips per code×24 code periods) with taps at the appropriate epoch positions as shown in FIG. 4.

The PDC output for this system with a single matched filter and three offsets (0, 2 and −2 chips) is shown in FIG. 5. The sync code is balanced, i.e. all codes appear eight times. The maximum spurious correlation level is about 7.4 dB lower than the desired peak. About 0.8 dB of the correlation loss of −1.2 dB is due to null-to-null filtering. This system meets the objectives of providing rapid and reliable signal detection and synchronization with a single noncoherent operation while providing hardware simplification over previously available techniques.

The PDC output for this system with five time offsets at 0, 2, −2, 4 and −4 chips is shown in FIG. 6. The maximum spurious correlation level is about eight dB lower than the desired peak. About 0.8 dB of the correlation loss of −1.6 db is due to null-to-null filtering.

The PDC output access noise generated when a sync burst constructed from Gold Code #4 is input to a five offset system designed for Gold Code #1 is shown in FIG. 7. The peak access noise is down about 9 dB.

It should be noted that the results shown can be improved by choice of codes, offsets, and offset sequence.

This technique can be applied wherever it is important to obtain accurate signal timing including SS, TDMA, and ranging system.

Referring now to FIG. 8, the invention is shown in context of a time division multiplexed communication system in which a traffic data stream from a data source is compression buffered in buffer 20 and the M PN based code synchronization sequence signal is generated in synchronization sequence generator 21. The data traffic and sync word signals are timed by time base generator 22 and multiplexed into frames by time division multiplexer 22. The frames of sync words and data traffic are imposed or carried by modulator 24 and upconverted by upconverter 25 and oscillator 26, power amplified 27 and broadcast by antenna 28 to receiver R, each incorporating matched filters as shown in FIG. 4, for example. In the embodiment of FIG. 8, the synchronization sequence signal is BPSK modulated while data traffic can use any form of PSK modulation, e.g. BPSK, QPSK, 8 PSK, or 16 PSK.

While the invention has been described in relation to preferred embodiments of the invention, it will be appreciated that other embodiments, adaptations and modifications of the invention will be apparent to those skilled in the art.

What is claimed is:

1. A wireless direct sequence spread spectrum communication system which includes a synchronization signal generator which generates a synchronization signal sequence, an RF transmitter which transmits the synchronization signal sequence, and one or more receiver that receives the signal, where:

said synchronization signal generator generates a synchronization signal sequence employs M time-shifted versions of a PN code that are cyclically repeated in a pseudo-random fashion for N code periods, and wherein each receiver incorporates a filter matched to the unshifted PN code and whose output samples are post detection combined in a manner consistent with the pseudo-random code transmission synchronization signal sequence to provide signal detection and synchronization.

* * * * *